United States Patent
Anand et al.

(10) Patent No.: US 8,321,547 B2
(45) Date of Patent: Nov. 27, 2012

(54) SYSTEM AND METHOD FOR PLANNING COMMUNICATION SYSTEMS

(75) Inventors: Ramasubramanian Anand, Plainfield, IL (US); Hector Ayala, Chicago, IL (US); Abhishek J. Desai, North Aurora, IL (US); Kenneth M. Fisher, Aurora, IL (US); David W. Jenkins, North Aurora, IL (US)

(73) Assignee: Tellabs Operations, Inc., Naperville, IL (US)

(*) Notice: Subject to any disclaimer, the term of this patent is extended or adjusted under 35 U.S.C. 154(b) by 640 days.

(21) Appl. No.: 12/125,213

(22) Filed: May 22, 2008

(65) Prior Publication Data

US 2009/0290507 A1    Nov. 26, 2009

(51) Int. Cl.
     *G06F 15/173*      (2006.01)
(52) U.S. Cl. .................................................... 709/223
(58) Field of Classification Search .............. 709/220, 709/221, 223, 224
See application file for complete search history.

(56) References Cited

U.S. PATENT DOCUMENTS

| | | | |
|---|---|---|---|
| 2003/0050048 A1 | 3/2003 | Abed et al. | |
| 2006/0072505 A1 | 4/2006 | Carrillo et al. | |
| 2007/0081472 A1* | 4/2007 | Chiang et al. | 370/254 |
| 2007/0118643 A1* | 5/2007 | Mishra et al. | 709/224 |
| 2008/0108345 A1 | 5/2008 | Calin et al. | |

OTHER PUBLICATIONS

Patent Application, "Method and Apparatus for Interactive Routing"; U.S. Appl. No. 11/936,379, filed Nov. 7, 2007; 29 pages.

* cited by examiner

*Primary Examiner* — Alicia Baturay
(74) *Attorney, Agent, or Firm* — Hamilton, Brook, Smith & Reynolds, P.C.

(57) ABSTRACT

A method for planning a multi-phase network includes storing initial parameter values for parameters associated with first and second growth phases in a multi-phase network plan, wherein each of the first and second growth phases is characterized by sets of the parameters. The method also includes calculating an initial growth scenario including the first and second growth phases based on the initial parameter values, and adjusting a value for at least one of the parameters to produce a modified parameter value. The method further includes automatically calculating a new growth scenario based on the modified parameter value and at least a portion of the initial parameter values, and displaying the new growth scenario. A computer readable medium for implementing the method described herein is also provided.

28 Claims, 16 Drawing Sheets

74

Growth Scenario (Phase 76)

◉ Network Element Site
○ Intermediate Site

BaseLined Scenario   84

● Network Element Site
○ Intermediate Site

SYSTEM AND METHOD FOR PLANNING COMMUNICATION SYSTEMS

BACKGROUND OF THE INVENTION

The present invention generally relates to communication systems and more particularly to a system and method for planning a communication system in a non-sequential growth pattern.

Communication systems are utilized in a variety of applications to transmit communication information from a local site to a remote site. Known communication systems include a computer system installed at the local site, a computer system installed at the remote site, and at least one communication line that transmits the communication information from the local site to the remote site.

Communication systems are typically planned by a network planner. More specifically, if an entity determines that a communication system should be installed between two locations, the network planner utilizes a program to design the communication system. The design and installation of a communication system is a relatively expensive and complex task undertaken by the entity. To enable the entity to design and construct the communication system, the network planner generates a network plan that is used by the entity to requisition the required equipment and to ensure that the communication system is being constructed in a cost-efficient manner. The network plan typically includes the locations where the communication system is to be installed, e.g. from city A to city B and terminating in a city C. The network plan is also used by the entity to ensure that the installation of the communication system is proceeding within the timeline set forth in the plan.

In general, the network plan generated by the network planner is relatively complex and includes a plurality of variables that may affect the overall progress of the communication system cost, design, and installation. For example, assuming that a network planner desires to construct a communication system between city A and city C via city B, the network planner determines the phases of the network plan. The network plan includes at least one phase, and typically many phases. Each phase includes at least one parameter and typically many parameters. For example, the network plan may include a first phase that outlines the construction of the communication system from city A to city B and a second phase that outlines the construction of the communication system from city B to city C. The first phase may include a plurality of parameters detailing the implementation of the first phase, such as for example, obtaining licenses, requisitioning equipments installing the communication line, and testing the completed communication pathway between city A and city B. The second phase may include a plurality of parameters detailing the implementation of the first phase, such as for example, obtaining licenses, requisitioning equipments installing the communication line, and testing the completed communication pathway between city B and city C.

Conventional network plans are implemented in a sequential order. For example, the first phase is implemented followed by the second phase. Moreover, the parameters within each phase are typically implemented in sequential order. However, when a desired change in the network plan is requested or a delay in the network plan occurs, the network planner must enter the change and manually determine the effects of the change on the existing network plan. For example, assuming a change in one of the parameters in the first phase is desired, the network planner must determine the effects of this change on both the first phase and the second phase of the network plan and then manually change the network plan to accommodate the requested change.

A need remains for a network planning tool that is capable of automatically updating a network plan to accommodate changes. Moreover a need remains for a network planning tool that is capable of automatically implementing a non-sequential multi-phased growth plan and updating the non-sequential growth plan based on desired changes.

BRIEF DESCRIPTION OF THE INVENTION

In accordance with at least one embodiment, a method for planning a multi-phase network includes obtaining initial parameter values for parameters associated with first and second growth phases in a multi-phase network plan, wherein each of the first and second growth phases is characterized by sets of the parameters. The method also includes calculating an initial growth scenario including the first and second growth phases based on the initial parameter values, and adjusting a value for at least one of the parameters to produce a modified parameter value. The method further includes automatically calculating a new growth scenario based on the modified parameter value and at least a portion of the initial parameter values, and displaying the new growth scenario. The method also includes automatically merging at least one of the initial growth scenario and the new growth scenario into a to-be-built network scenario, the to-be-built network representing a base-lined scenario, and entering a state of a currently built network as at least a portion of the initial parameter values, the state of the currently built network representing a deployed scenario.

In another embodiment, a network planning tool for generating a multi-phase network plan includes a growth scenario module. The growth scenario module is programmed to obtain initial parameter values for parameters associated with first and second growth phases in a multi-phase network plan, wherein each of the first and second growth phases is characterized by sets of the parameters. The growth scenario module is also programmed to calculate an initial growth scenario including the first and second growth phases based on the initial parameter values, receive an input to adjust a value for at least one of the parameters to produce a modified parameter value, and automatically calculate a new growth scenario based on the modified parameter value and at least a portion of the initial parameter values.

In another embodiment, a computer readable medium for planning a multi-phase network is provided. The computer readable medium is programmed to instruct a computer to obtain initial parameter values for parameters associated with first and second growth phases in a multi-phase network plan, wherein each of the first and second growth phases is characterized by sets of the parameters. The computer readable medium is also programmed to calculate an initial growth scenario including the first and second growth phases based on the initial parameter values, and adjust a value for at least one of the parameters to produce a modified parameter value. The computer readable medium is also programmed to automatically calculate a new growth scenario based on the modified parameter value and at least a portion of the initial parameter values, and display the new growth scenario. The computer readable medium also automatically merges at least one of the initial growth scenario and the new growth scenario into a to-be-built network scenario, the to-be-built network representing a base-lined scenario, and enters a state of a currently built network as at least a portion of the initial parameter values, the state of the currently built network representing a deployed scenario.

DETAILED DESCRIPTION OF THE INVENTION

An example embodiment of a method, network planning tool, and a computer readable medium for planning a multi-phase network is described herein. For ease of describing the exemplary method, each node is represented as residing in a different city. However, it should be realized that the method for planning a multi-phase network may also be applied to planning a multi-phase network that includes a plurality of nodes wherein some or all of the nodes are located in the same general location, e.g. the same city. Although the method is described with respect to the exemplary network, those skilled in the art will appreciate that this is merely one example embodiment of the present invention, which is not limited to either mesh networks divided into rings or mesh networks in general. Rather, the method for planning a multi-phase network may be applied to a network that extends only from a first city or node to a second city or node.

Various terms are used herein to describe aspects of the present invention. For example, a deployed scenario represents the current physical state of an existing communication network. A growth scenario represents a planned addition or modification to the existing communication network, e.g. the deployed scenario that is generated by the network planner using the network planning tool. The growth scenario may include a single phase or multiple phases. A phase may represent the entire growth scenario or a portion of the growth scenario. For example, the growth scenario may represent a growth plan between node A and node B wherein the implementation of the growth scenario is scheduled to be accomplished in a single phase or time period. Optionally, the growth scenario may include multiple phases or time periods. For example, assuming the growth plan represents a plan to install a communication network between a node A and a node B via a node C, the first phase in the growth scenario may represent the growth plan between node A and node C and the second phase may represent the growth plan between node C and node B. A base-lined scenario represents at least one approved growth scenario that is intended to be implemented on the deployed network. For example, once a growth scenario or multiple growth scenarios are approved, the one or multiple growth scenarios are merged into a base-lined scenario that is utilized by an entity to plan and construct a new communication network or an addition and/or modification to the an existing communication network.

Figure 1:
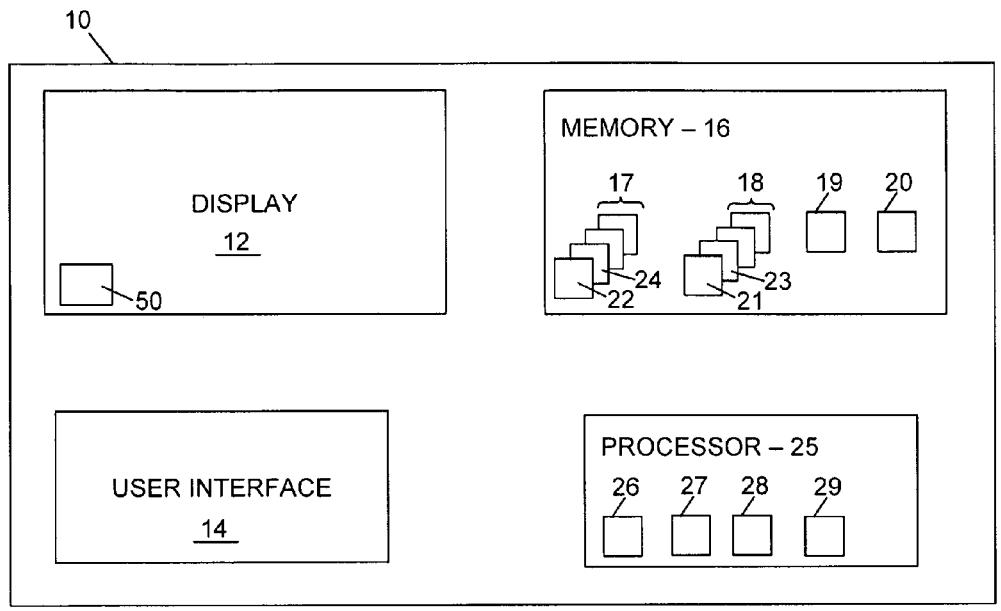
FIG. 1 illustrates a block diagram of an exemplary computer that is programmed to perform the methods described herein in accordance with an embodiment of the present invention.

FIG. 1 illustrates an exemplary network planning tool 10 for planning a multi-phase network. The network planning tool 10 may be embodied as a personal computer, a laptop computer, or a handheld computer. The network planning tool 10 may also be connected to other computers or network planning tools 10 via a communication link, such as a LAN system, and Ethernet network, or the Internet. For example, the network planning tool 10 may be accessed locally at the network planning tool 10. The network planning tool 10 may also be configured as a web server to enable a network planner to utilize the network planning tool 10 from a remote location via the Internet.

In the exemplary embodiment the network planning tool 10 includes a display 12 and a user interface 14, such as a mouse. The network planning tool 10 also includes a memory 16 to obtain the planning information described herein. While memory 16 is illustrated as a single memory, those skilled in the art will appreciate that it may include multiple memory devices, which may be of different types, and may provide memory for storing control programs and working memory used during information processing and/or display. The memory 16 includes a plurality of files that are used by the network planner to generate a growth scenario, a base-lined scenario, and/or a deployed scenario. Each file includes electronic data or records that are stored in a common location within the network planning tool 10. In the exemplary embodiment, the memory 16 includes at least one growth scenario file 17, a base-lined scenario file 18, a deployed scenario file 19, and a network file 20.

In the exemplary embodiment, the memory 16 includes a plurality of growth scenario files 17. At least one of the growth scenario files 17 may include parameters that represent an existing growth scenario, e.g. a growth scenario that has been previously entered into the network planning tool 10 and stored in the memory 16. The parameters are information or data that are either entered by the network planner or extracted from a data file such as a network data file 20 discussed below. The parameters may include the originating site or node where the communication system is to be built. The originating site or node may represent a new node, e.g. a site where no current communication node exists. The originating site may also represent an existing node, wherein the growth scenario is generated to extend from the existing node to a new destination node or to an existing destination node. The parameters may also include, the destination site or node, a route designation between the originating node and the destination node, a list of equipment to support the network, a customer demand or information traffic to be supported by the network, and a cable type to be used in the route. Moreover, at least one of the growth scenario files 17 may represent an active growth scenario, e.g. a growth scenario that is currently being generated by the network planner.

The memory 16 also includes a plurality of base-lined scenario data files 18. A base-lined scenario file 18 may include the same information as that stored in at least one growth scenario data file 17 and generally includes the same information as that stored in a plurality of growth scenario data files 17. An example of the information stored in a growth scenario file is the parameter values and the planner generated content. The planner generated content may represent any additional information that is used by the network planner to develop the network plan. The information may be manually input into the base-lined scenario file 18, automatically retrieved from at least one growth scenario file 17, or automatically retrieved from the deployed data file 19 or the network data file 20. For example, a base-lined scenario data file 21 may include the information retrieved or downloaded from a single growth scenario data file 22. A second base-lined scenario data file 23 may include the information retrieved from a second growth scenario data file 22 and the information stored in a second growth scenario data file 24. In the case when the base-lined scenario data file includes more than one growth scenario data file, the information, data, or parameters within each individual growth scenario data file, e.g. files 22 and 24, are merged into the single base-lined scenario data file 23.

The memory 16 also includes at least one deployed scenario data file 19 and at least one network data file 20. The deployed scenario data file 19 includes data or information representative of the state an existing or installed communication network. For example, the deployed scenario data file 19 may include the data representative of the location of installed nodes, the equipment installed at each node, the type of cable installed between each node, the quantity of data traffic processed by each node, and/or the operational status of the equipment installed at each node.

In the exemplary embodiment, to generate the deployed scenario data file 19, the network planning tool 10 is programmed to automatically query existing equipment connected to the network planning tool 10. For example, assuming that the installed network is connected via a common communication link, the network planning tool 10 may send a message across the communication link to each piece of equipment requesting status information. The status information may include, for example, the type of equipment installed, the quantity of traffic being processed by each piece of equipment, the quantity of traffic sent from each node, the addresses from which the equipment is receiving information, the addresses to which the equipment is transmitting data, etc. The status information generated by the network planning tool 10 is automatically stored in the network data file 20. In the exemplary embodiment, the network planning tool 10 automatically queries and stores information related to the as-built status of the communication network in the network data file 20. The network planning tool 10 then automatically processes the information stored in the network data file 20 to generate the deployed scenario data file 19 representative of the installed communication system.

The network planning tool 10 also includes a processor 25 to control the operation of network planning tool 10. In this exemplary embodiment, the processor 25 executes program code stored in memory 16, which causes the network planning tool 10 to perform a method as described below with respect to the exemplary embodiments. The program code may, for example, be stored in a read-only section of memory 16, be stored on a removable computer-readable medium and transferred to network planning tool 10, or may be downloaded to the network planning tool 10 via a communication link, e.g., via the Internet. Also, those skilled in the will realized that the network planning tool 10 may be controlled by an equivalent hardware circuit providing the same functions.

In the exemplary embodiment, the processor 25 includes a growth scenario module 26, a base-lined scenario module 27, a deployed scenario module 28, and a network data module 29. The modules 26, 27, 28, and 29 may be embodied as separate central processing units wherein each respective module is a separate logic device that executes a program or instructions installed on each respective module. Optionally, each module 26, 27, 28, and 29 may be embodied as a single central processing unit that includes a single set of instructions that are executed on any data that is sent to the central processing unit.

During operation, the growth scenario module 26 retrieves data from the growth scenario file 17. The growth scenario module 26 then executes preprogrammed instructions using the data stored in the growth scenario file 17. The pre-programmed instructions may include, for example, calculating a distance between the originating site or node and the destination node, calculating the quantity of cable to be installed between each node, generating a bill of materials, calculating the cost of equipment to be installed at each node, calculating a time-line indicating the time required to complete or install the growth scenario, and generating a graphical illustration of the growth scenario.

The base-lined scenario module 27 retrieves data from the base-lined scenario file 18. The base-lined scenario module 27 then executes preprogrammed instructions using the data stored in the base-lined scenario file 18. The pre-programmed instructions may include, for example, calculating a difference between two growth scenarios stored in the base-lined scenario file 18, graphically displaying the differences on the display 12, calculating the quantity of cable to be installed between each node in the base-lined scenario, generating a bill of materials, calculating the cost of equipment to be installed at each node, calculating a time-line indicating the time required to complete or install the base-lined scenario, and generating a graphical illustration of the base-lined scenario.

The deployed scenario module 28 retrieves data from the deployed scenario file 19. The deployed scenario module 28 then executes preprogrammed instructions using the data stored in the deployed scenario file 19. Optionally, the deployed scenario module 28 may retrieve data from the network data file 20 and perform instructions thereon. The pre-programmed instructions may include, for example, automatically generating a graphical illustration of the installed communication network, automatically updating the deployed scenario and displaying the deployed scenario on the display 12.

The network data module 29 retrieves data from the network data file 20. The network data module 29 then executes preprogrammed instructions using the data stored in the network data file 20. The pre-programmed instructions may include, automatically query network equipment that is coupled to the network planning tool 10 and automatically store the received network status data in the network data file 20.

Figure 2A:
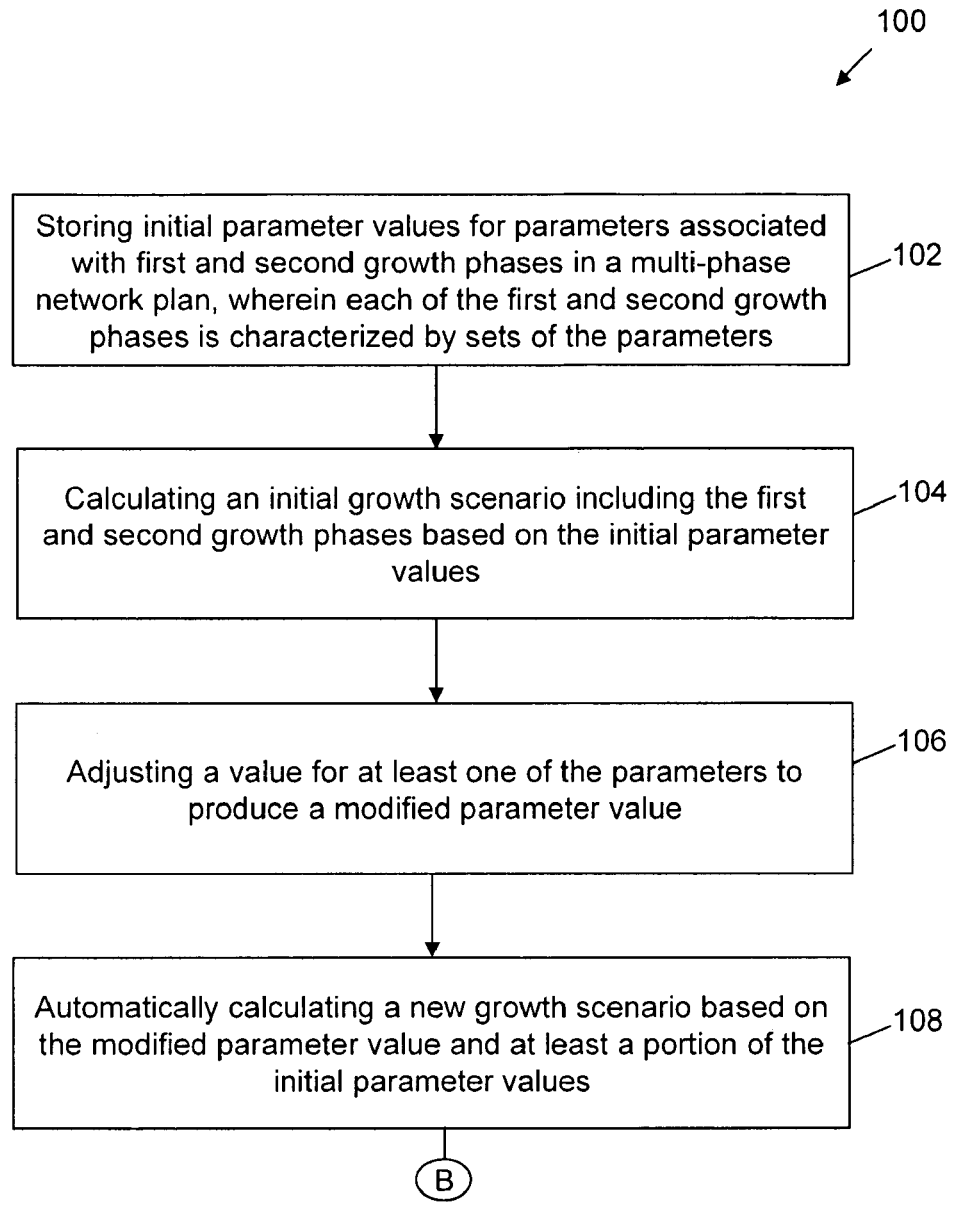
FIGS. 2A and 2B illustrate a flow chart of a method for planning a multi-phase network in accordance with an embodiment of the present invention.
Figure 2B:
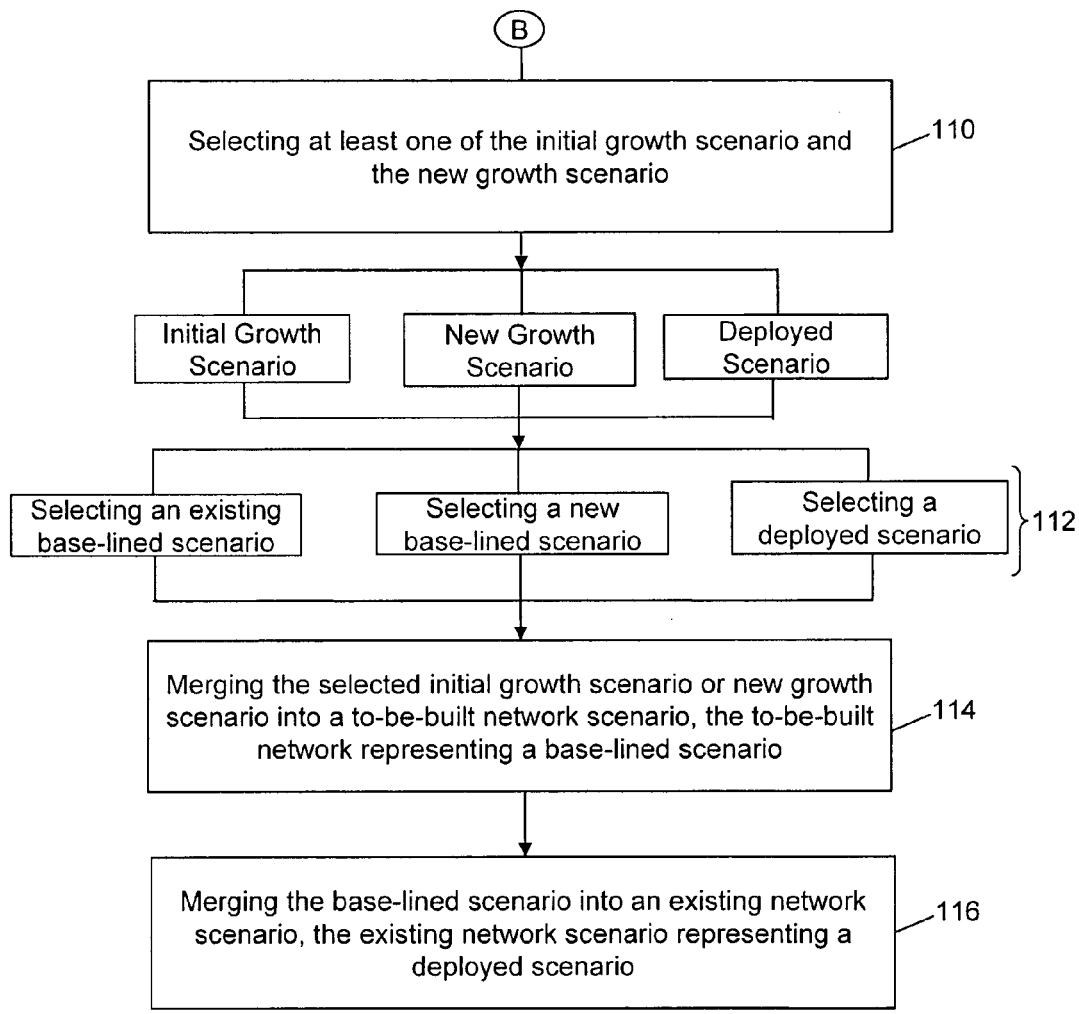

FIG. 2 is a flowchart illustrating an exemplary method 100 for planning a multi-phase network in accordance with an embodiment of the present invention. The method 100 enables a network planner to plan or design a communication network in a non-sequential multi-phased growth pattern. In the exemplary embodiment, the network communication plan, e.g. the growth scenarios, the base-lined scenarios, and the deployed scenario, developed by the network planner in method 100 are stored in the memory 16 of the network planning tool 10 as discussed above. Optionally, the network communication plan may be stored on a computer readable medium and then installed into the network planning tool 10. The network planner utilizes the network planning tool 10 to implement the methods described herein.

To access the multi-phase network planning tool 10, the network planner selects an icon that enables the network planner to enter a scenario planning mode. The scenario planning mode is utilized by the network planner to generate at least one of a growth scenario, a base-lined scenario, and a deployed scenario, or a combination thereof. During operation, the scenario planning mode ensures that a scenario has been selected before the network planner enters other planning modes discussed below. For example, the network planning mode may query the network planner to save unsaved changes in a first growth scenario before the network planner can select another growth scenario to work on. In the exemplary embodiment, the scenario planning mode supports an operation to save the currently opened scenario when the network planning tool 10 is exited and also may allow a network planner with sufficient access rights to make modifications to the deployed and base-lined scenarios.

As shown in FIG. 2, a method 100 for planning a multi-phase network includes obtaining 102 initial parameter values for parameters associated with first growth and second growth phases in a multi-phase network plan. In the exemplary embodiment, the parameters are obtained from at least one of the growth scenario file 17, the base-lined scenario file 18, the deployed scenario file 19 or the network data file 20. The parameters associated with a growth phase may include, for example, the location of the origination node, the location of a destination node, and the type of equipment to be installed at each node. The parameter values may include, for example, at least two of a site designation along a network, a route designation within the network, a list of equipment to support the network, an amount of demand to be supported by the network, and/or a cable type to be used in a route. The initial parameter values may also include an operation to change the name of a network growth scenario or the name of the phase in which the growth scenario is to be accomplished.

For example, the growth scenario may represent a growth plan between node A and node B wherein the implementation of the growth scenario is scheduled to be accomplished in two phases. The first phase in the growth scenario may represent the growth plan between a node A and a node B and the second phase may represent a growth plan between node B and node C. Therefore, the parameters for the first phase may include the location of nodes A and B, and the type of equipment to be installed at nodes A and B. The first phase initial parameter values may include, for example, the location of nodes A and B, the type of cable to be installed between nodes A and B, the cost of cable per linear foot, and a time-frame for installing the equipment and the cable between nodes A and B. The parameters associated with the second phase may include the location of node C, and the type of equipment to be installed at nodes B and C. The second phase initial parameter values may include, for example, the location of nodes B and C, the type of cable to be installed between nodes B and C, the cost of cable per linear foot, and a time-frame for installing the equipment and the cable between nodes B and C. In one embodiment, the initial parameter values for each of the first and second phases are manually entered into the network planning tool 10 by the network planner. Optionally, the initial parameter values for the first and second phases may be automatically retrieved from a file stored on the network planning tool 10, e.g. the network data file 20 or the growth scenario data file 17, using the growth scenario module 26.

Method 100 also includes calculating 104 an initial growth scenario including the first and second growth phases based on the initial parameter values. In the exemplary embodiment, o calculate a growth scenario, the network planner selects the growth scenario icon 50 displayed on the display 12 to enable the network planner to access the growth scenario planning mode. During operation, the growth scenario planning mode enables the network planner to create an initial growth scenario. The initial growth scenario may be a stand-alone scenario, created based on an existing deployed scenario, created using an existing base-lined scenario, or created based on a merged scenario that includes the deployed scenario and base-lined scenario. In the exemplary embodiment, when an initial growth scenario is created from a deployed scenario, if the equipment that has been deployed in the field has to be modified or removed, the network planning tool 10 may be programmed to verify that the network planner has sufficient access rights and has provided confirmation for the requested changes. Optionally, a network planner may confirm the requested changes. Moreover, when a growth scenario is created using an existing deployed scenario, the network planner is provided an option to either recreate the manual constructs used inside the growth scenario or reuse the constructs that are available in the base-lined scenario. The constructs may include, for example, Logical Paths. The scenario planning mode also supports an operation to merge multiple growth scenarios into a single growth scenario, or into a base-lined scenario. The scenario planning mode also enables the network planner to delete a growth scenario and/or delete multiple growth scenarios.

In the exemplary embodiment, the initial growth scenario is calculated using the growth scenario module 26 based on data retrieved from either the growth scenario file 17 or the network data file 20. Calculating 104 an initial growth scenario includes, for example, calculating a distance between nodes A and B, calculating the cost of the cable to be installed based on the distance, calculating the cost of the equipment, generating a graphical illustration of the growth scenario, and generating a bill of materials representative of the growth scenario.

Method 100 also includes adjusting 106 a value for at least one of the parameters to produce a modified parameter value. For example, during operation, the network planner may determine that the destination node is to be changed to a new node D, the cost of cable is different than the cost entered in the initial growth scenario, that different equipment should be installed at a node, etc. In the exemplary embodiment, the network planner enters accesses the initial growth scenario and modifies at least one of the initial growth parameters.

The network planning tool 10 is then programmed to automatically 108 calculate a new growth scenario based on the modified parameter value and at least a portion of the initial parameters values. For example, assuming the initial growth scenario includes a set of initial parameters values, and the network planner modifies at least one of the initial parameters in the initial growth scenario, the network planning tool 10 is programmed to automatically generate a new growth scenario utilizing the modified parameter and the portion of the initial parameter values that remain unchanged. The network planning tool 10 is also programmed to display the new growth scenario on display 12, for example.

Method 100 also includes selecting 110 at least one of the initial growth scenario and the new growth scenario. In the exemplary embodiment, the selection is performed by a super-user based on the network communication plan. For example, as discussed above, the network planning tool 10 may include a plurality of network growth files 17, wherein each network growth file 17 represents a different network growth phases or phases that are contemplated by the network entity to be installed in the existing network. Accordingly, the network planner or super-user selects at least one growth scenario based on the communication network envisioned to be constructed by the entity. The network planning tool 10 supports an operation to select multiple growth scenarios and a sub-selection of the phases within at least one or a plurality of growth scenarios to merge into the base-lined scenario.

Moreover, the network planning tool 10 is programmed to enable the network planner to select a phase in the initial growth scenario and merge the selected phase all the preceding phases into the base-lined scenario. The other remaining phases are then automatically re-calculated based on the modified parameter value and at least a portion of the initial parameter values and a new growth scenario is generated. The growth scenario planning mode also enables a network planner to compare two different growth scenarios and display the pricing differences between the two growth scenarios Method 100 also includes selecting 112 a base-lined scenario to merge with the initial growth scenario or the new growth scenario. The network planning tool 10 may include a plurality of base-lined scenario files 18, wherein each base-lined scenario represents a different network growth phases or phases that have been selected by the network entity to be installed in the existing network. In the exemplary embodiment, the network planner may select an existing base-lined scenario file 18 that includes at least one growth scenario file 17. The network planner may also select a new-base-lined file 18 that does not include a growth scenario file 17. Accordingly, the network planner or super-user selects at least one base-lined scenario based on the communication network envisioned to be constructed by the entity.

The method 100 also includes merging 114 the selected growth scenario file 17 into the selected base-lined scenario file 18. During operation, after the growth scenario and the base-lined scenario are selected, the base-lined scenario module 27 is programmed to download the selected growth scenario file or files 17 from the memory 16. The base-lined scenario module is then programmed to merge the selected growth scenario file 17 into the selected base-lined scenario file 18. The merged file or new base-lined file represents the total data contained within each respective file 17 and 18, wherein duplications of data have been deleted to form the merged base-lined file 18.

After merging at least one growth scenario into the base-lined scenario, any conflicts between either the growth scenarios, or the growth scenarios and an existing base-lined scenario, are displayed. Optionally, the network planning tool 10 may import a state of a currently built network as at least a portion of the initial parameter values, wherein the state of the currently built network represents a deployed scenario. More specifically, the network planner may use the existing deployed scenario to generate either a growth scenario or a base-lined scenario. The scenario planning mode also enables the network planner to export network data from the base-lined scenario to external data files and to import network data files into the base-lined scenario.

During operation, the network data files may be imported from external data files using an exemplary file import wizard. For example, the file import wizard enables the network planner to import Site Data Files, Node Data Files, Fiber Data Files, and Demands Data Files. The file import wizard is also programmed to provide a preview of the file imported into the growth scenario.

Method 100 also includes automatically merging 116 the base-lined scenario into an existing network scenario, the existing network scenario representing a deployed scenario. For example, during operation the network planning tool 10 enables network data 20 to be imported into the deployed scenario. In the exemplary embodiment, the network data 20 represents a "snapshot" of the currently deployed network. In the exemplary embodiment, the scenario planning mode allows the network planner to save only one deployed network inside a scenario, warns the network planner if a deployed network exists inside a scenario and the network planner is trying to import another deployed network, and display the differences between the deployed network in the scenario and the yet to be imported deployed network data. For example, when a base-lined scenario is imported into the deployed scenario, the scenario planning mode validates the base-lined scenario against the deployed scenario. Moreover, when a new growth scenario is imported into the deployed scenario, the scenario planning mode validates all the growth scenarios against the deployed scenario.

FIGS. 3-16 illustrate an exemplary multi-phase network that may be generated by a network planner using the method 100 shown in FIG. 2. It should be realized that FIGS. 3-16 represent only one example of generating a multi-phase network plan and that the method 100 may be utilized to plan a wide variety of network plans that each may be programmed in non-sequential multi-phase growth patterns that are different than the exemplary growth plans described herein.

Figure 3:
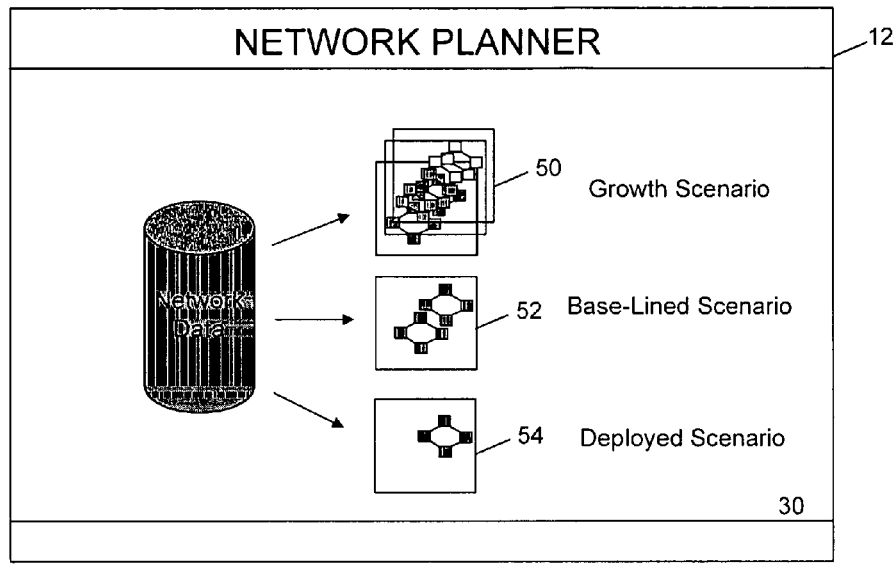
FIG. 3 an exemplary screen that is displayed using the method shown in FIG. 2 in accordance with an embodiment of the present invention.

To plan a multi-phase network, the network planner utilizes the user interface 14 to activate the network planning tool 10. For example, FIG. 3 illustrates an exemplary screen 30 displayed on the display 12 that is activated by the network planner when enabling the network planning tool 10. The screen 30 includes at least three icons that enable the network planner to plan the communication network. The icons include at least a create/modify a growth scenario icon 50, create/modify a base-lined scenario icon 52, and create/modify a deployed scenario icon 54. Network data 56 may be utilized with the functions associated with the growth scenario, the base-lined scenario, and the deployed scenario. The network data 56 represents data that is available to the network planner from either the deployed scenario or the base-lined scenario. For example, the network data 56 may include communication traffic patterns, communication traffic quantities, and/or a status of operational sections of the deployed scenario. During operation, the network planner selects at least one of the three icons 50, 52, and/or 54 to utilize the network planning tool 10.

If a deployed scenario already exists, the planning tool displays the differences between the deployed scenario and the data that has been imported. The planning tool also validates the base-lined scenario against the deployed scenario and displays the errors and warnings, if any, and also validates the growth scenarios against the deployed scenario and displays the errors and warnings, if any.

Figure 4:
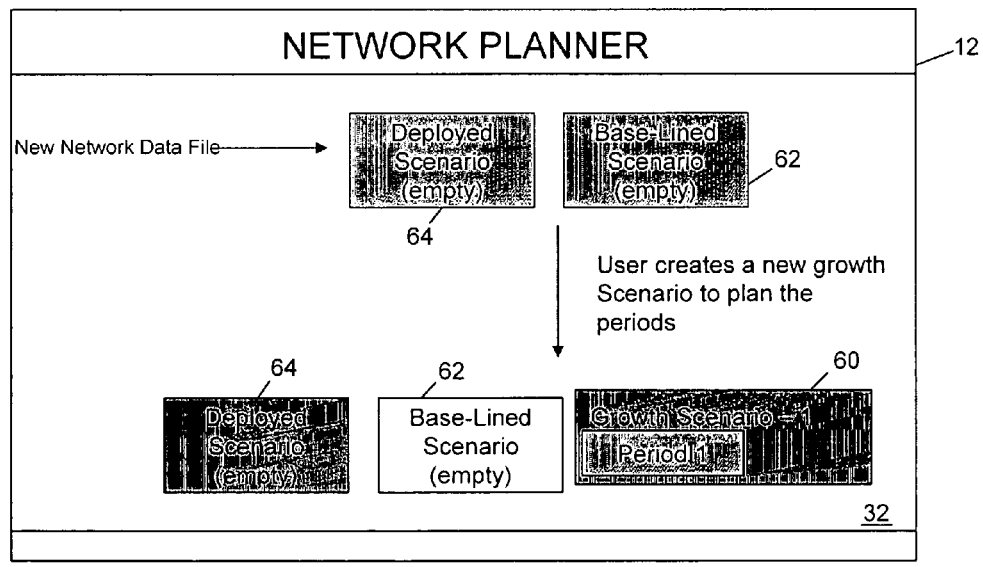
FIG. 4 is another exemplary screen that is displayed using the method shown in FIG. 2.

Referring again to FIG. 3, and in the exemplary embodiment, the network planner selects the growth scenario icon 50 that enables the network planner to access the growth scenario planning mode of the network planning tool 10. For example, FIG. 4 illustrates an exemplary screen 32 displayed on the display 12 that is activated when the growth scenario icon 50 is selected. Selecting the growth scenario icon 50 enables the network planner to generate an initial network growth scenario 60, e.g. "growth scenario 1". A growth scenario represents a network growth plan that may be selected by the network planner to be merged into a base-lined scenario 62 as will be discussed below. It should be realized that numerous growth scenarios may be generated by a network planner, and some or all of the growth scenarios may be merged into the base-lined scenario 62.

As shown in FIG. 4, in this embodiment, the base-lined scenario 62 and a deployed scenario 64 are not used to create the growth scenario 60. More specifically, as discussed above, in one embodiment, the network planner may use an existing base-lined scenario (not shown) and/or an existing deployed scenario (not shown) to assist the network planner in planning a new growth scenario 60. However, in the exemplary embodiment, growth scenario 60 represents the network planner's initial concepts or plans for creating a communication network wherein there is no existing communication network installed. As such, the icons representing the base-lined scenario 62 and the deployed scenario 64 are shown as "empty".

To create the growth scenario 60, the network planner inputs parameters that are associated with at least one phase 66 of the growth scenario 60. For example, referring again to FIG. 2, method 100 includes obtaining 102 initial parameter values for parameters associated with first and second growth phases in a multi-phase network plan, wherein each of the first and second growth phases is characterized by sets of the parameters. The initial parameters may include an originating site or node, a destination site or node, a route designation within the network, a list of equipment to support the network, an amount of demand to be supported by the network, and a cable type to be used in the route. It should be realized that numerous parameters are used to generate a growth scenario, and that the parameters described above, are exemplary only, and that other parameters may also be entered into the growth scenario. In the exemplary embodiment, at least two parameters are entered into the growth scenario 60.

Figure 5:
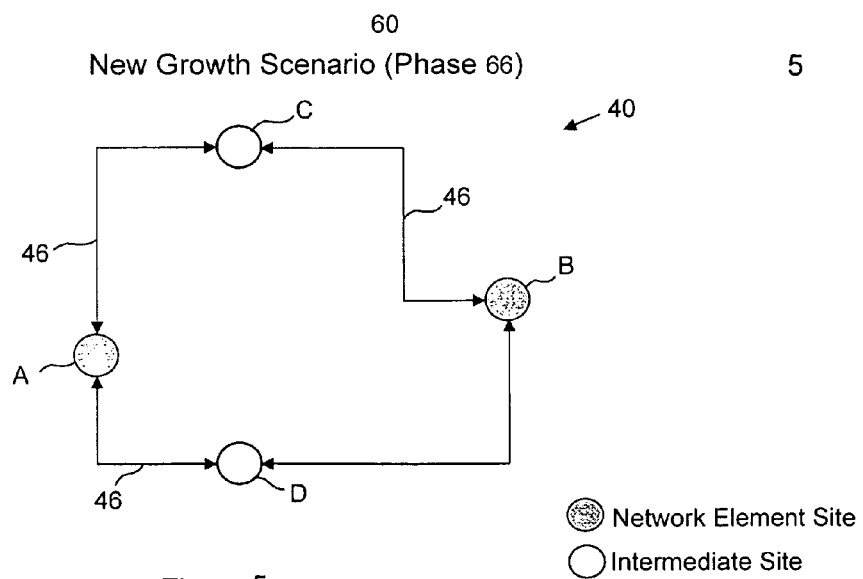
FIG. 5 illustrates an exemplary growth scenario generated using the method shown in FIG. 2 in accordance with an embodiment of the present invention.

As shown in FIG. 4, the growth scenario 60 includes the phase 66. The phase 66 may represent a time period to implement the growth scenario 60 or may represent sub-portions of the growth scenario 60. For example, FIG. 5 illustrates the exemplary phase 66 of growth scenario 60. As shown in FIG. 5, the phase 66 represents a network communication system plan to be implemented between a first node A and a second node B via a third node C and a fourth node D, respectively. The phase 66 may represent a first construction phase between nodes A and B via node C or a second construction phase between nodes A and B via node D. Optionally, the phase 66 may represent a timed phase wherein the parameters are scheduled as timed milestones. For example, a first portion of the parameters may be scheduled in a first quarter of a first year, and another portion of the parameters may be scheduled in a second quarter of the first year. In the exemplary embodiment, the growth scenario 60 stores the parameters in a sequential order based on either the time of the scheduled completion of the parameter or the sequence of events in which the parameters are to occur or both. In the exemplary embodiment, phase 66 represents the planning scenario between node A and node B.

In the exemplary embodiment, the growth scenario 60 includes a single phase 66, however, it should be realized that a growth scenario may include a single phase, such as phase 66, or may include multiple phases, and that phase 66 is illustrated as one example of implementing method 100. It should also be realized that an exemplary communication network may have multiple nodes installed in a single city or nodes that connect two cities. Each node includes network equipment that enables the node to serve as a source node, e.g., a node where the information is transmitted from, or a destination node, e.g. a node designated to receive the information. In the exemplary embodiment, the communication network is an optical network for transporting voice, data, video information, and various other information to and/or from the respective nodes or cities. In the exemplary embodiment, each node A, B, C, and/or D is coupled to another node via an optical fiber link 46. However, the links 46 are not limited to optical fibers.

Figure 6:
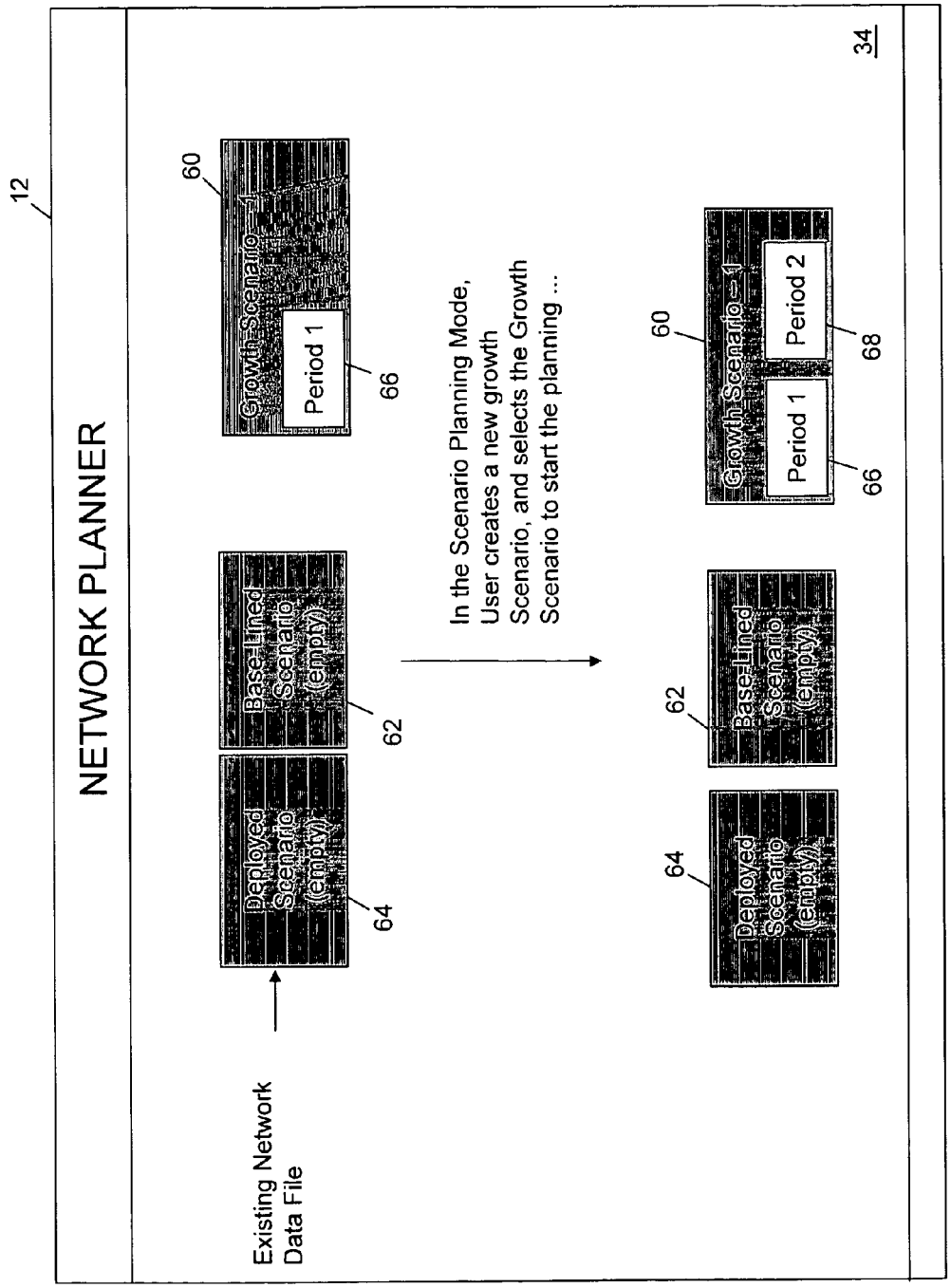
FIG. 6 is another exemplary screen that is displayed using the method shown in FIG. 2.

After the planning for the first phase 66 of growth scenario 60 is completed, in the exemplary embodiment, the network planner may choose to plan a second phase 68. FIG. 6 is illustrates an exemplary screen 34 displayed on the display 12 that is activated when the growth scenario icon 50 is selected. In the exemplary embodiment, the network planner selects the growth scenario icon 50 (shown in FIG. 3) that enables the network planner to access the growth scenario planning mode of the network planning tool 10. The network planner then selects the growth scenario 60 to enable the network planner to edit or revise growth scenario 60 to include an additional phase 68.

Figure 7:
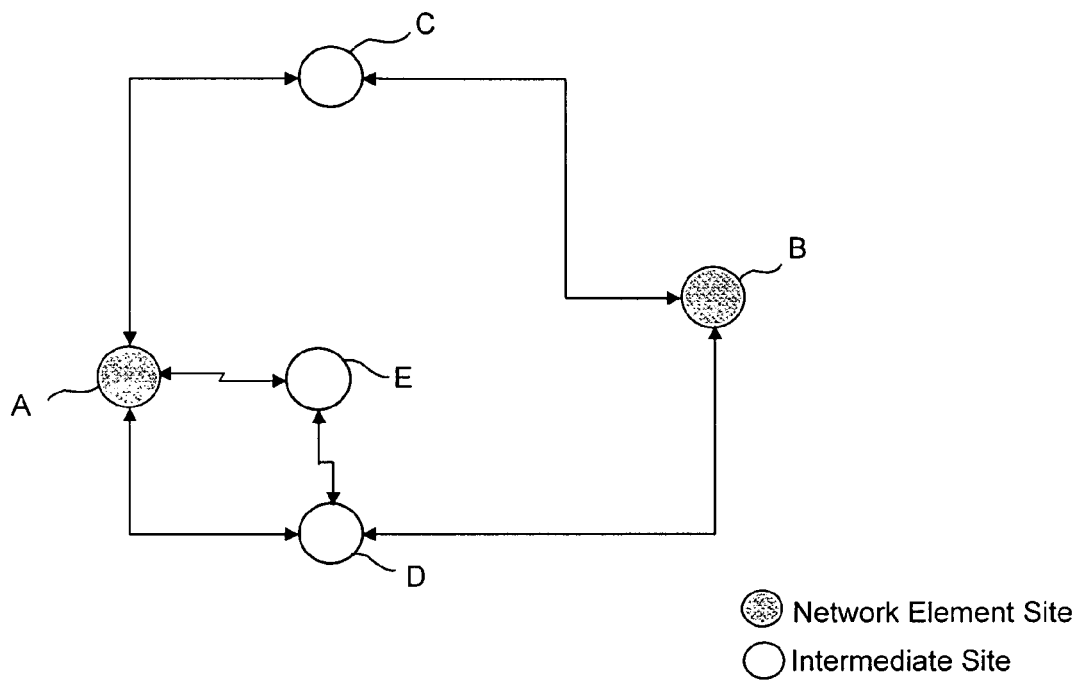
FIG. 7 illustrates another exemplary growth scenario and an exemplary base-lined scenario generated using the method shown in FIG. 2 in accordance with an embodiment of the present invention.

In the exemplary embodiment, method 100 also includes adjusting 106 a value for at least one of the parameters for produce a modified parameter value and automatically calculating 108 a new growth scenario based on the modified parameter value and at least a portion of the initial parameter values. For example, to revise the growth scenario 60, to include phase 68, the network planner inputs parameters that are associated with the phase 68 of the growth scenario 60. As discussed above, the parameters represent values associated with the respective phases in the growth scenario 60. For example, FIG. 7 illustrates the exemplary phase 68 of growth scenario 60. As shown in FIG. 7, the growth scenario 60 has been modified to include an additional node E that is to be installed between nodes A and C. In the exemplary embodiment, to modify the growth scenario 60 to include each of phases 66 and 68, a value of at least one of the parameters of phase 66 is modified include phase 68. For example, the parameters indicating that node A should first be constructed to node B, may be modified such that node A is first coupled to node E and then node C, and the construction of node A to node C is delayed to accommodate the construction of node A to E via node E. The growth scenario 60 is then automatically recalculated based on the modified parameter value and at least a portion of the initial parameter values.

Figure 8:
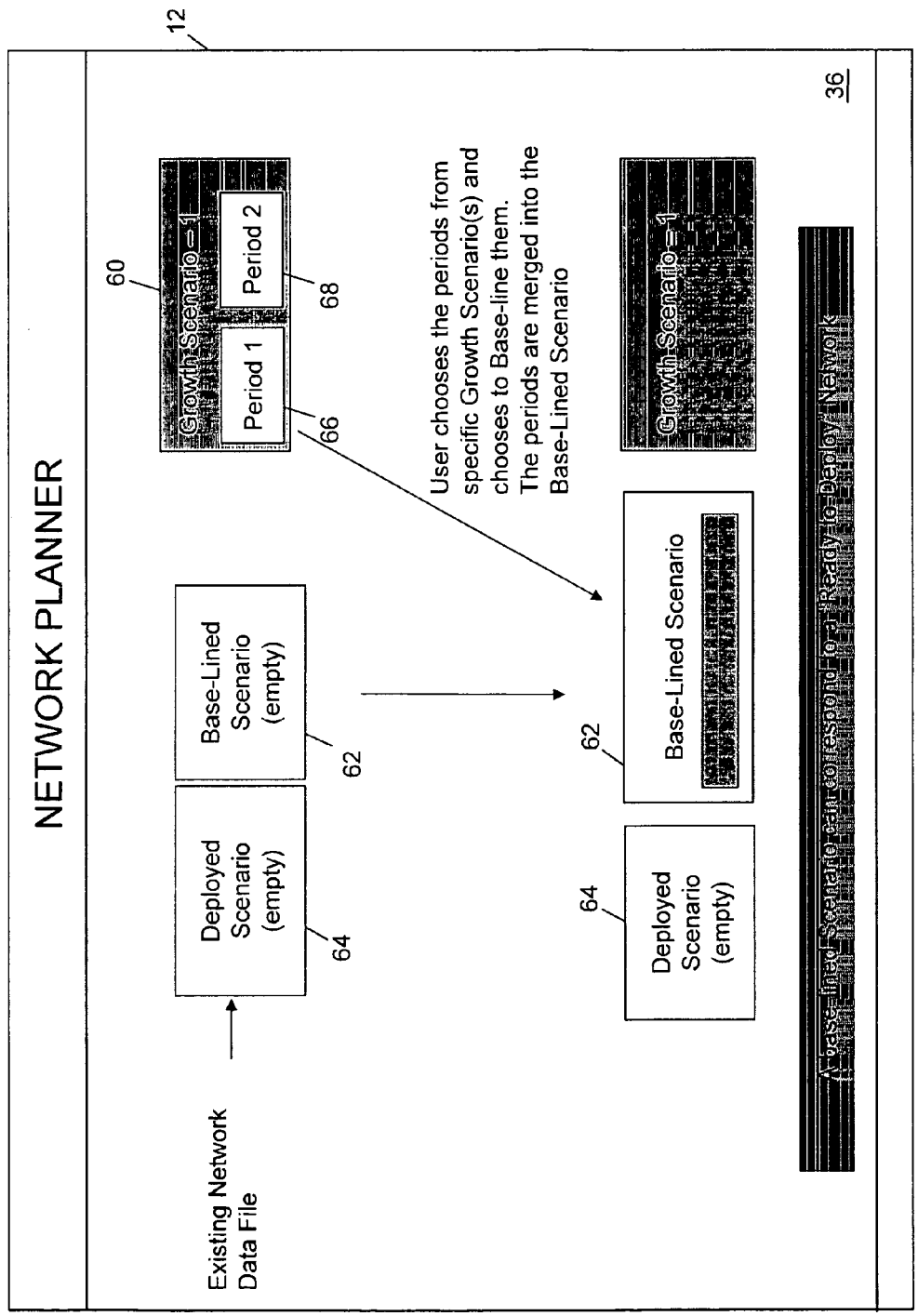
FIG. 8 is another exemplary screen that is displayed using the method shown in FIG. 2.

FIG. 8 illustrates an exemplary screen 36 displayed on the display 12 that is activated when the base-lined scenario icon 52 is selected. Selecting the base-lined scenario icon 52 enables the network planner to generate a base-lined scenario 62. A base-lined scenario represents at least one approved growth scenario, e.g. growth scenario 60, that is intended to be implemented on the deployed network. As shown in FIG. 8, in the exemplary embodiment, to create the base-lined scenario 62, the network planner selects at least one growth scenario to be merged into the base-lined scenario 62. As discussed above, multiple growth scenarios may be merged into a single base-lined scenario 62. Additionally, the network planner selects at least one phase in the growth scenario to be merged into the base-lined scenario 62. For example, the network planner may select either phase 66 or phase 68 to be merged into the base-lined scenario 62. Optionally, the network planner may choose both phases 66 and 68. In the exemplary embodiment, the base-lined scenario 62 is created using both the phases 66 and 68 as shown in FIG. 8. Accordingly, FIG. 7 represents both the second phase 68 of growth scenario 60 and the base-lined scenario 62.

Figure 9:
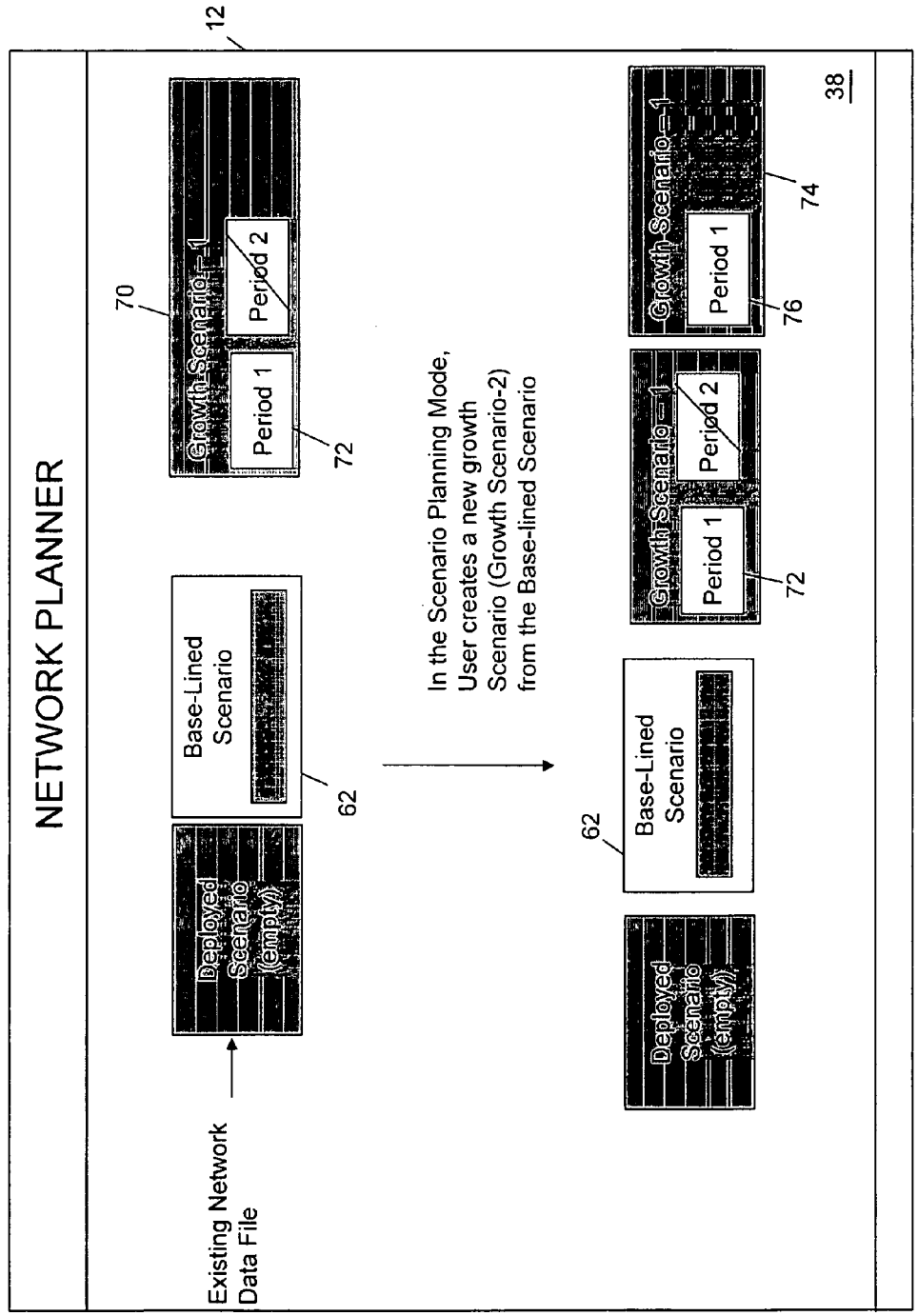
FIG. 9 is another exemplary screen that is displayed using the method shown in FIG. 2.

FIG. 9 illustrates another exemplary screen 38 displayed on the display 12 that is used by the network planner to generate another network growth scenario 70, e.g. "growth scenario 2 using a base-lined scenario, e.g. base-lined scenario 62. During operation, the network planner selects the base-lined scenario icon 52 shown in FIG. 3. The network planner then selects the base-lined scenario to be used to generate the growth scenario 70. In this case, the network planner selects the base-lined scenario 62. It should be realized that the network planning tool 10 may include a plurality of base-lined scenarios of which base-lined scenario 62 is exemplary.

Figure 10:
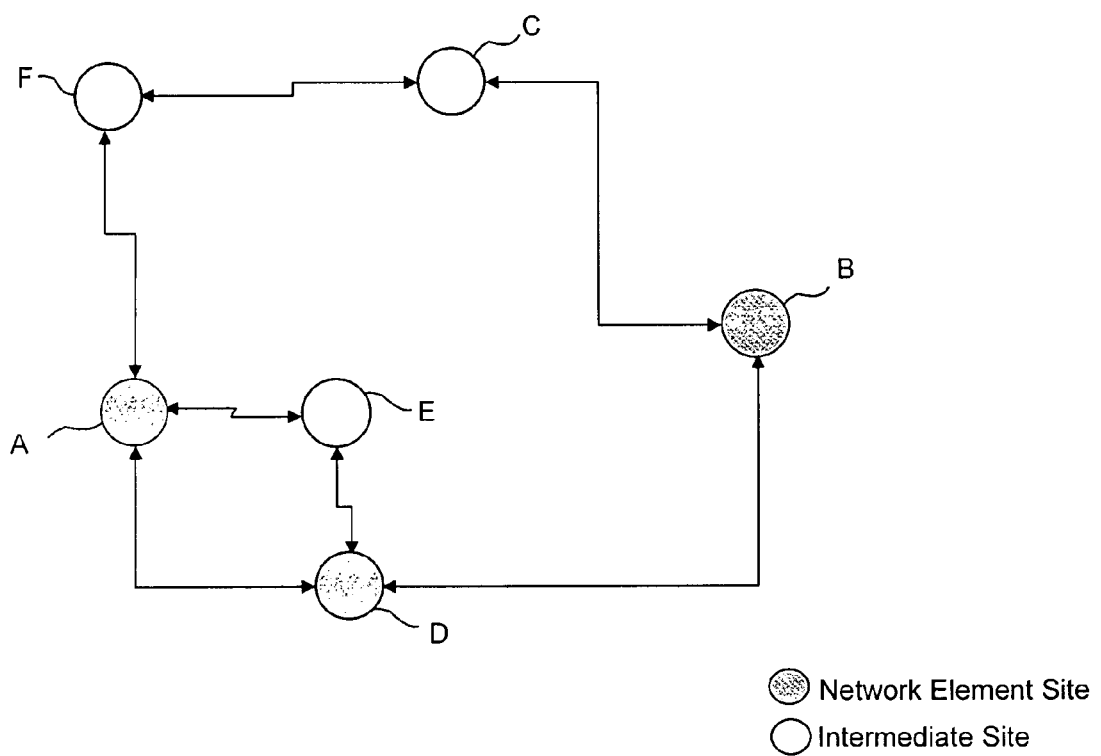
FIG. 10 is another exemplary growth scenario generated using the method shown in FIG. 2 in accordance with an embodiment of the present invention.

To create the growth scenario 70, the network planner inputs parameters that are associated with at least one phase 72 of the growth scenario 70. In the exemplary embodiment, at least two parameters are entered into the growth scenario 70. As shown in FIG. 9, the growth scenario 70 includes only phase 72. FIG. 10 illustrates the exemplary phase 72 of growth scenario 70. As shown in FIG. 10, the base-lined scenario 62 represents a network plan between a first node A and a second node B via a third node C and a fourth node D, respectively. The base-lined scenario 62 also represents a network plan between a first node A and third node C via a fifth node E. The growth scenario 62 represents a network plan between node D and node E, and a network plan between first node A and a sixth node F.

Figure 11:
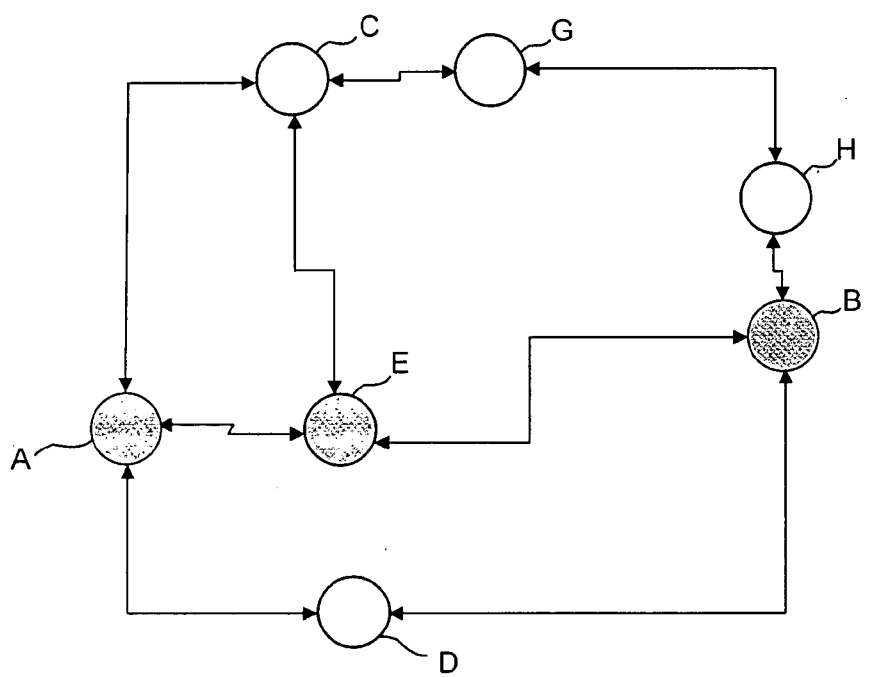
FIG. 11 is another exemplary growth scenario generated using the method shown in FIG. 2 in accordance with an embodiment of the present invention.

After the planning for the phase 72 of growth scenario 70 is completed, the network planner may choose to plan another growth scenario 74 as shown in FIG. 9. In the exemplary embodiment, the growth scenario 74 includes only phase 76. FIG. 11 illustrates the exemplary phase 76 of growth scenario 74. As shown in FIG. 11, the base-lined scenario 62 represents a network plan between a first node A and a second node B via a third node C and a fourth node D, respectively. The base-lined scenario 62 also represents a network plan between a first node A and third node C via a fifth node E. The growth scenario 70 includes the base-lined scenario 62 and also includes the growth scenario 70, phase 72 between nodes D and E, and the growth scenario 74, phase 76 between nodes B and C via nodes G and H.

Figure 12:
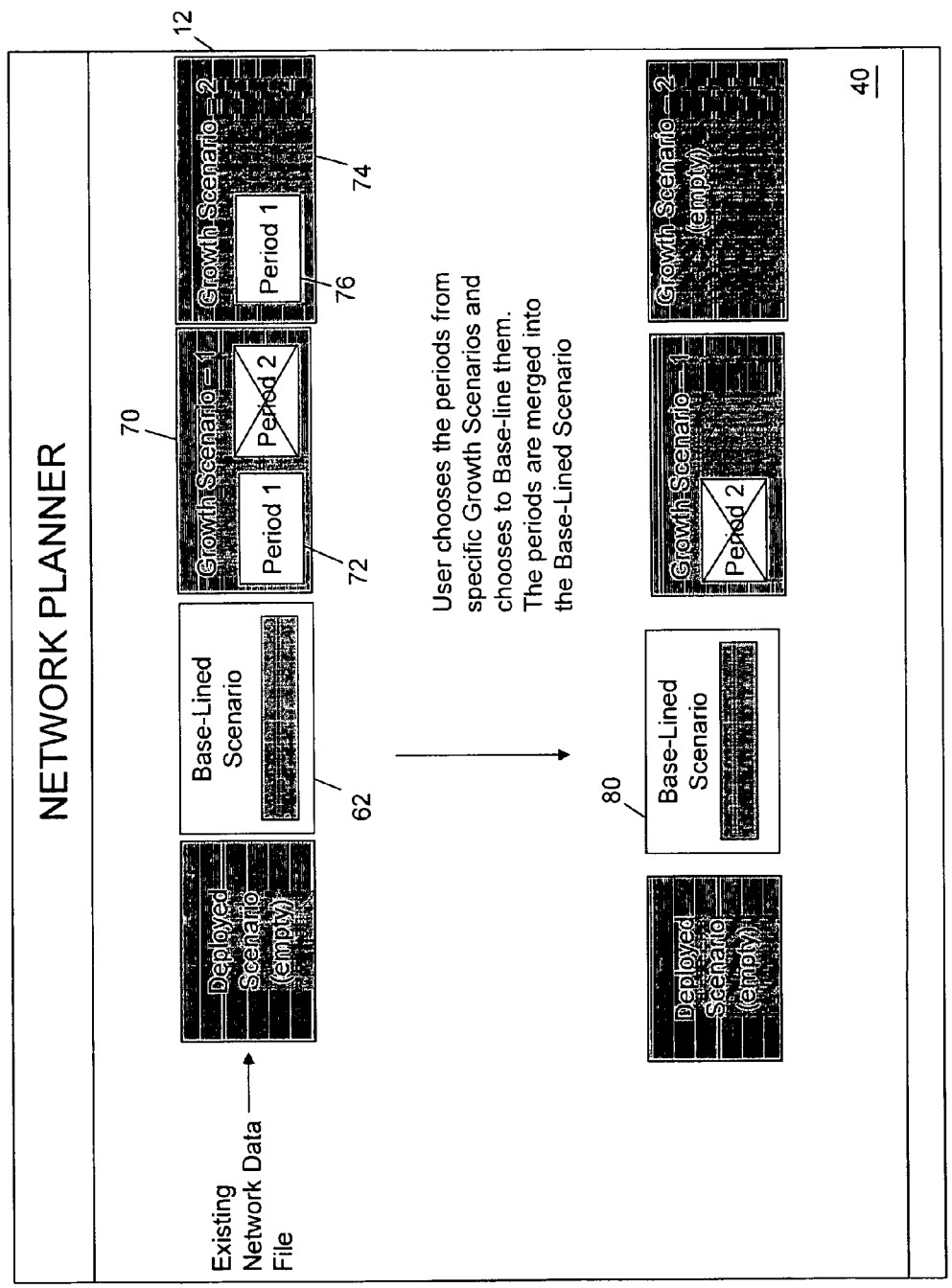
FIG. 12 is another exemplary screen that is displayed using the method shown in FIG. 2.
Figure 13:
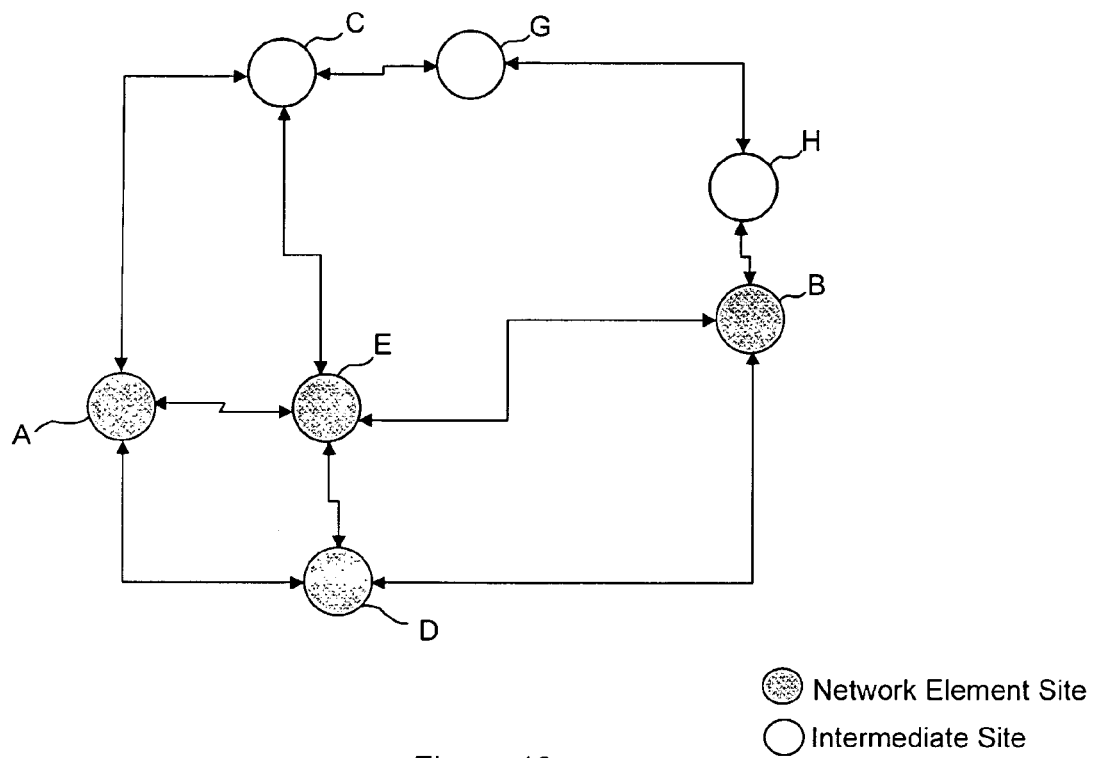
FIG. 13 is another exemplary growth scenario generated using the method shown in FIG. 2 in accordance with an embodiment of the present invention.

FIG. 12 illustrates an exemplary screen 40 displayed on the display 12 that is activated when the base-lined scenario icon 52 is selected. As discussed above, selecting the base-lined scenario icon 52 enables the network planner to generate a base-lined scenario, e.g. base-lined scenario 80. A base-lined scenario represents at least one approved growth scenario, e.g. growth scenario 70 and/or 74 that is intended to be implemented on the deployed network. As shown in FIG. 12, in the exemplary embodiment, to create the base-lined scenario 80, the network planner selects at least one growth scenario to be merged into the previously base-lined scenario 62 to generate base-lined scenario 80. As discussed above, multiple growth scenarios may be merged into a single base-lined scenario. For example, the network planner may select either phase 72 of growth scenario 70 or phase 76 of growth scenario 74 to be merged into the base-lined scenario 62 and thus create the new base-lined scenario 80. Optionally, the network planner may choose both phases 72 and 76. In the exemplary embodiment, the base-lined scenario 80 is created using both the phases 72 and 76 as shown in FIG. 12. Accordingly, FIG. 13 represents the newly creates growth scenario 80 to was generated by modifying the base-lined scenario 62 to include the phases 72 and 76.

Figure 14:
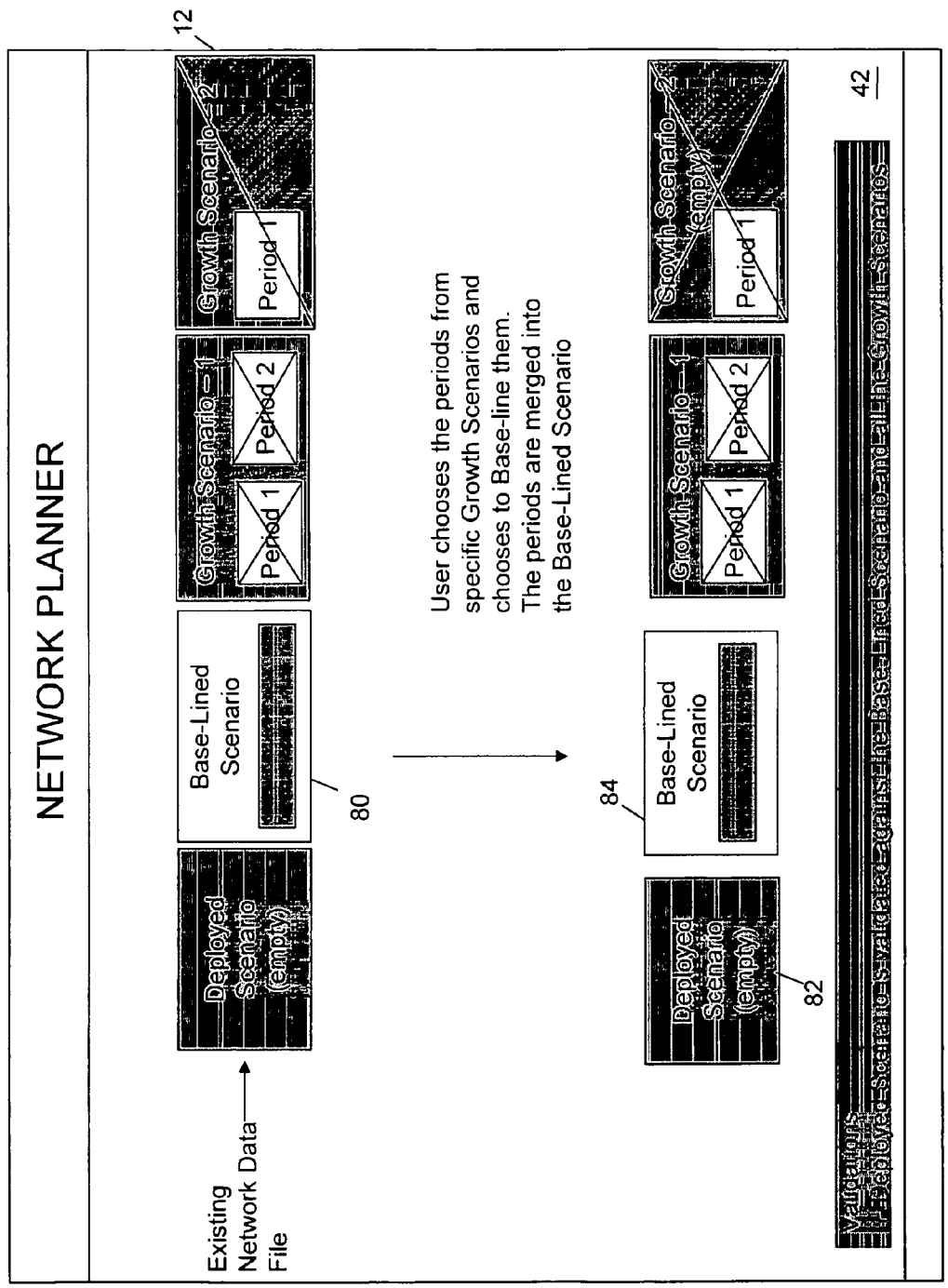
FIG. 14 is another exemplary screen that is displayed using the method shown in FIG. 2.
Figure 15:
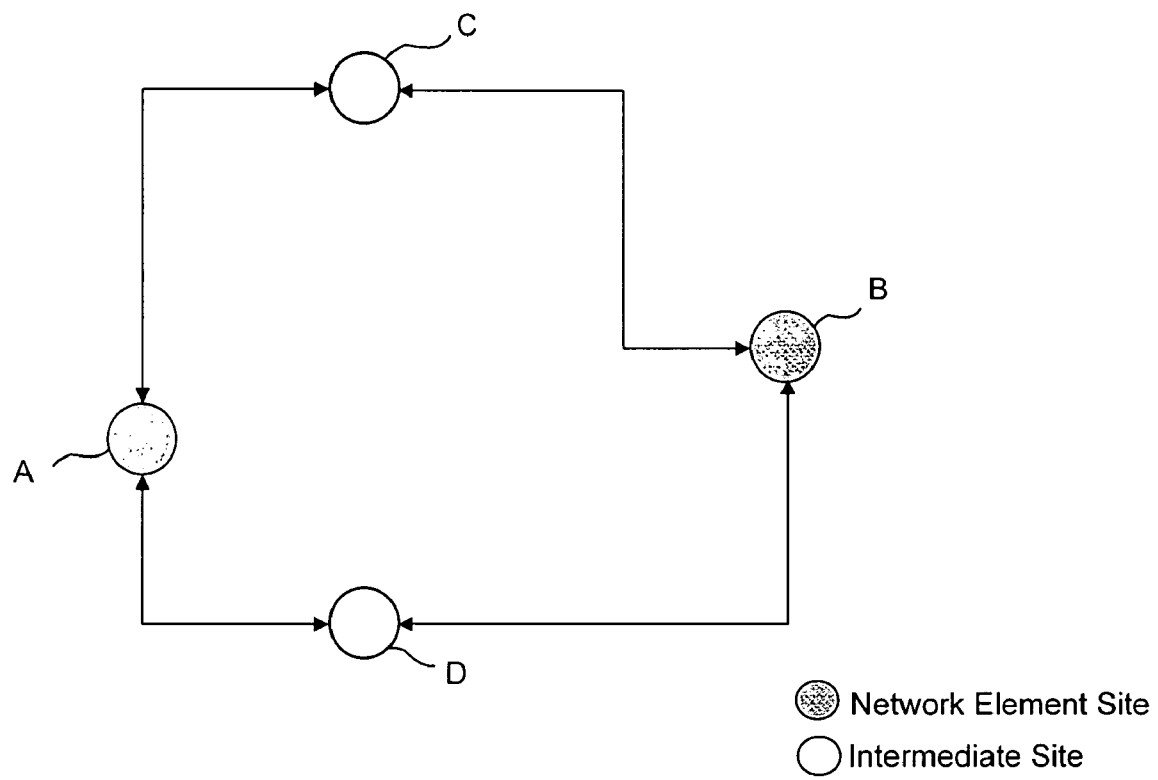
FIG. 15 is an exemplary deployed scenario generated using the method shown in FIG. 2 in accordance with an embodiment of the present invention.

FIG. 14 illustrates an exemplary screen 42 displayed on the display 12 that is activated when the deployed scenario icon 54 is selected. As discussed above, selecting the deployed scenario icon 54 enables the network planner to utilize a deployed scenario to generate a growth scenario. The deployed scenario represents at least one approved growth scenario, e.g. growth scenario 60, phase 66 that has been installed or constructed. For example, FIG. 15 represents an exemplary deployed scenario 82. In this embodiment, the deployed scenario 82 represents the growth scenario 60, phase 66 (shown in FIG. 5 has been constructed. More specifically, as discussed above, the base-lined scenario 80 (shown in FIG. 12) includes growth scenarios 60, 70, and 74 which are represented in FIG. 13. During operation, the network planner, or a super-network planner, updates the deployed scenario 82 as construction is completed. In one embodiment, the network planner manually updates the deployed scenario 82 based on various updates from outside sources, such as for example, the construction crew, etc. In the exemplary embodiment, the network planning tool 10 automatically updates the deployed scenario using inputs received from the communication system.

Figure 16:
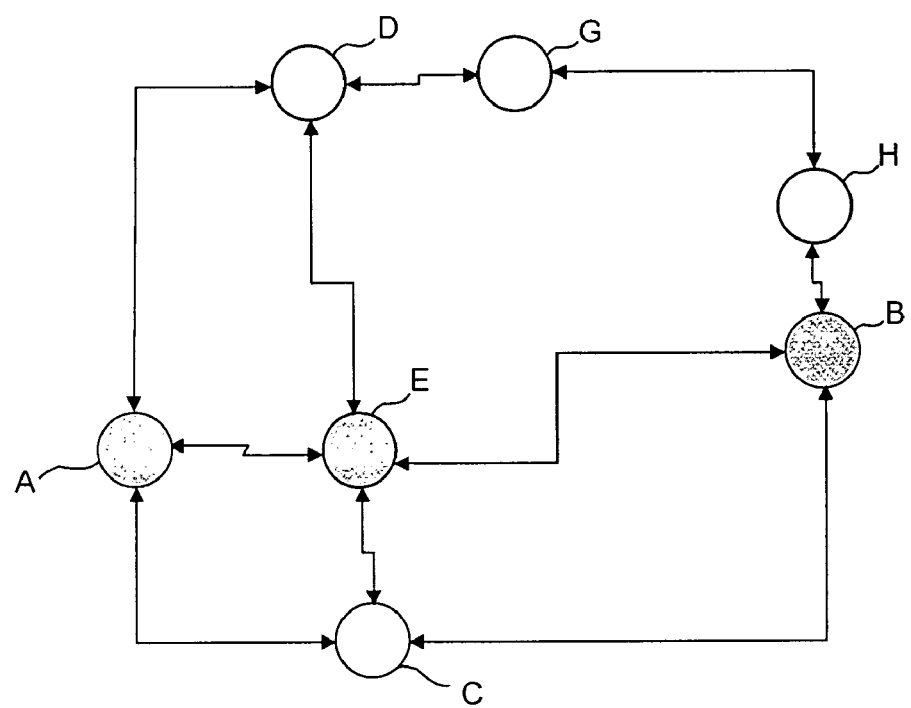
FIG. 16 is another exemplary base-lined scenario generated using the method shown in FIG. 2 in accordance with an embodiment of the present invention.
Figure 17:
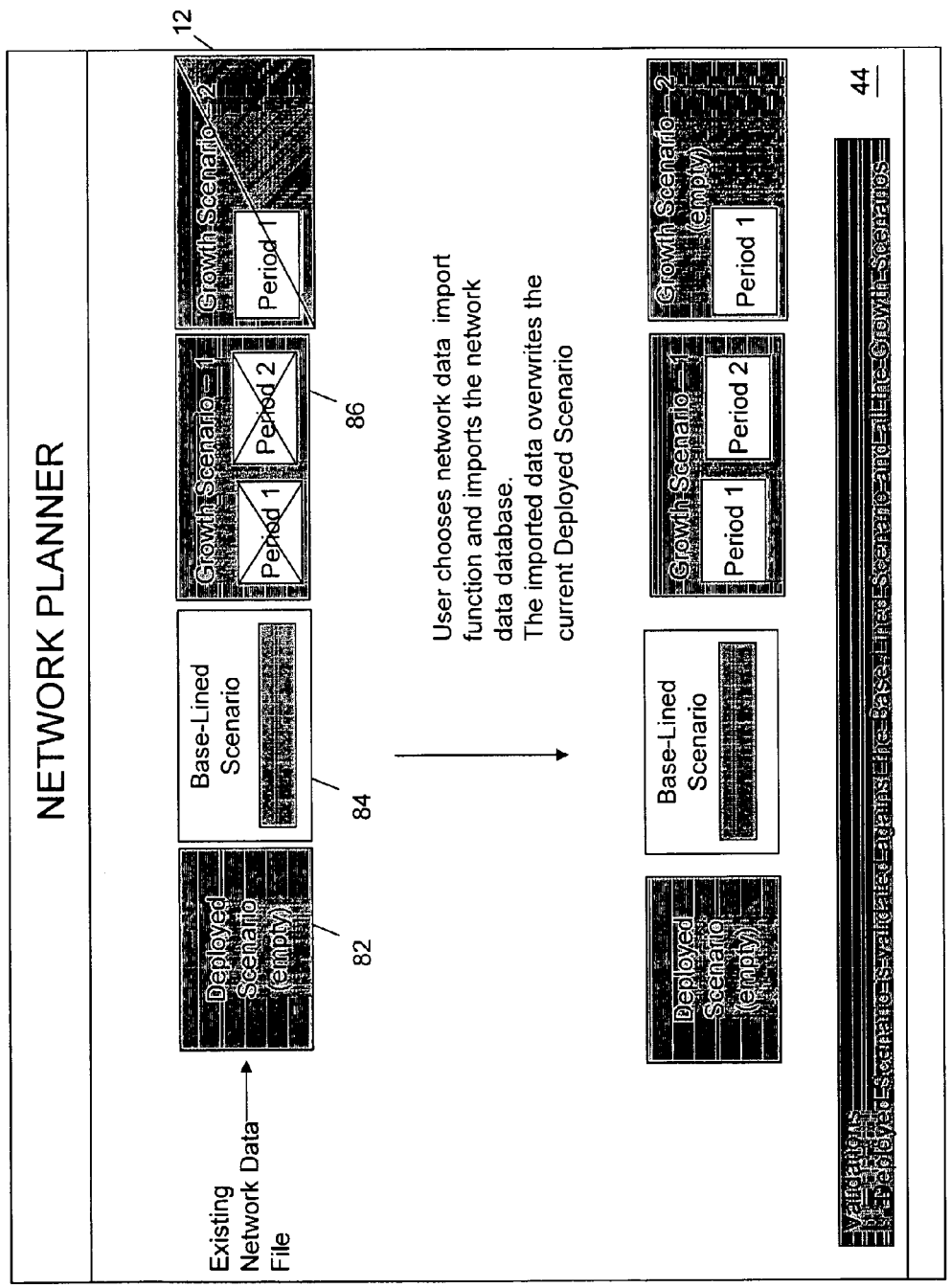
FIG. 17 is another exemplary screen that is displayed using the method shown in FIG. 2.

For example, referring again to FIG. 15, as the communication equipment is installed at nodes A, B, C, and/or D, this communication equipment transmits signals to the network planning tool 10. The network planning tool 10 then automatically updates the deployed scenario 82. Additionally, as the links are established between the nodes, the communication system transmits this information to the network planning tool 10 to indicate that at least one of the nodes is in communication with another node. The network planning tool 10 utilizes this information to update the deployed scenario 82. The network planning tool 10 then automatically updates the base-lined scenario 80 to generate a revised base-lined scenario 84 that is shown in FIG. 16 wherein the dark lines represent the deployed scenario 82 and the light lines represent the base-lined scenario 84. The revised base-lined scenario 84 now includes growth scenario 60 phase 2, and growth scenarios 70 and 74. As discussed above, a new growth scenario 86 may be then generated using either the deployed scenario 82, the base-lined scenario 84, or may be generated as a new communication system as shown in FIG. 17.

The method and apparatus described herein enables a network planner to plan a communication network in a non-sequential multi-phased growth pattern. For example, in multi-phased network planning that spans geographical boundaries, the build out of the communication network may not occur sequentially as the network planner has envisioned. The method described herein accommodates building the communication network if the planned phases are not sequential and also enables the network planner to plan for future growth based on a currently deployed network and/or a base-lined scenario. In operation, the method described herein differentiates the different periods or phases of the communications network build-out to facilitate planning for future growth based on the currently built network.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the embodiments of the present invention without departing from its scope. While the dimensions, types of materials and coatings described herein are intended to define the parameters of the embodiments of the present invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

While the invention has been described in terms of various specific embodiments, those skilled in the art will recognize that the embodiments of the present invention can be practiced with modification within the spirit and scope of the claims.

What is claimed is:

1. A method for planning a multi-phase network, comprising:
   obtaining initial parameter values for parameters associated with first and second growth phases in a multi-phase network plan, the first and second growth phases representing different potential construction phases of the multi-phase network, wherein each of the first and second growth phases is characterized by sets of the parameters;
   calculating an initial growth scenario including the first and second growth phases based on the initial parameter values using a network planning device, the growth scenario representing a plan to implement the first and second growth phases in a first sequential order;
   adjusting a value for at least one of the parameters to produce a modified parameter value;
   automatically calculating a new growth scenario, to implement the first and second growth phases in a different second sequential order, based on the modified parameter value and at least a portion of the initial parameter values using the network planning device; and
   displaying the new growth scenario on a display.

2. The method of claim 1 wherein adjusting a value for at least one of the parameters further comprises adjusting the value of at least three of a site designation along a network, a route designation within the network, a list of equipment to support the network, an amount of demand to be supported by the network, and a cable type to be used in a route.

3. The method of claim 1 further comprising automatically merging at least one of the initial growth scenario and the new growth scenario into a to-be -built network scenario, the to-be-built network representing a base-lined scenario.

4. The method of claim 1 further comprising:
   entering a state of a currently built network as at least a portion of the initial parameter values, the state of the currently built network representing a deployed scenario; and
   automatically merging the deployed scenario and the initial growth scenario to calculate the new growth scenario.

5. The method of claim 1 further comprising:
   entering a state of a currently built network as at least a portion of the initial parameter values, the state of the currently built network representing a deployed scenario; and
   automatically merging the initial growth scenario and the deployed scenario to generate a base-lined scenario.

6. The method of claim 1 further comprising:
   calculating a plurality of new growth scenarios; and
   automatically calculating a base-lined scenario based on the plurality of new growth scenarios.

7. The method of claim 1 further comprising displaying conflicts between the initial growth scenario and the new growth scenario.

8. The method of claim 1 further comprising:
   storing initial parameter values in a first sequential order in the multi-phase network plan; and
   automatically calculating a new growth scenario that includes the parameter values stored in a second sequential order.

9. The method of claim 1 further comprising storing initial parameter values for parameters representing at least one of a time-based phase and a project-based phase.

10. The method of claim 1, wherein the initial growth scenario represents a plan to implement the first and second growth phases in a first time sequential order.

11. The method of claim 1, wherein the initial growth scenario represents a plan to implement the first and second growth phases in a first construction sequential order.

12. The method of claim 1, wherein the initial growth scenario represents a plan to implement the growth phases between a first node, a second node, and a third node in first sequential order, and the new growth plan represents a different plan to implement the growth phases between a first node, a second node, and a third node in different second sequential order.

13. A network planning device for generating a multi-phase network plan, the network planning device comprising:
   a growth scenario module programmed to:
      obtain initial parameter values for parameters associated with first and second growth phases in a multi-phase network plan, the first and second growth phases representing different potential construction phases of the multi-phase network, wherein each of the first and second growth phases is characterized by sets of the parameters;
      calculate an initial growth scenario including the first and second growth phases based on the initial parameter values, the initial growth scenario representing a plan to implement the first and second growth phases in a first sequential order;
      receive an input to adjust a value for at least one of the parameters to produce a modified parameter value; and
      automatically calculate a new growth scenario, to implement the first and second phases in a different second sequential order, based on the modified parameter value and at least a portion of the initial parameter values.

14. The network planning device in accordance with claim 13 wherein the growth scenario module is further programmed to receive an input to adjust a value for at least one of the parameters further comprises adjusting the value of at least two of a site designation along a network, a route designation within the network, a list of equipment to support the network, an amount of demand to be supported by the network, and a cable type to be used in a route.

15. The network planning device in accordance with claim 13 further comprising a base-lined scenario module programmed to automatically merge at least one of the initial growth scenario and the new growth scenario into a to-be-built network scenario, the to-be-built network representing a base-lined scenario.

16. The network planning device in accordance with claim 13 further comprising a deployed scenario module programmed to:
receive information representing a state of a currently built network as at least a portion of the initial parameter values, the state of the currently built network representing a deployed scenario; and
automatically merge the deployed scenario and the initial growth scenario to calculate the new growth scenario.

17. The network planning device in accordance with claim 13 further comprising a deployed scenario module programmed to:
receive information representing a state of a currently built network as at least a portion of the initial parameter values, the state of the currently built network representing a deployed scenario; and
automatically merge the initial growth scenario and the deployed scenario to generate a base-lined scenario.

18. The network planning device in accordance with claim 13 wherein the growth scenario module is further programmed to calculate a plurality of new growth scenarios and a base-lined scenario module is programmed to automatically calculate a base-lined scenario based on the plurality of new growth scenarios.

19. The network planning device in accordance with claim 10 wherein the growth scenario module is further programmed to display conflicts between the initial growth scenario and the new growth scenario.

20. The network planning device in accordance with claim 13 wherein the growth scenario module is further programmed to:
obtain initial parameter values in a first sequential order in the multi-phase network plan; and
automatically calculate a new growth scenario that includes the parameter values stored in a second sequential order.

21. A non-transitory computer readable medium for planning a multi-phase network, the computer readable medium programmed to instruct a computer to:
obtain initial parameter values for parameters associated with first and second growth phases in a multi-phase network plan, the first and second growth phases representing different potential construction phases of the multi-phase network, wherein each of the first and second growth phases is characterized by sets of the parameters;
calculate an initial growth scenario including the first and second growth phases based on the initial parameter values, the initial growth scenario representing a plan to implement the first and second growth phases in a first sequential order;
adjust a value for at least one of the parameters to produce a modified parameter value;
automatically calculate a new growth scenario, to implement the first and second phases in a different second sequential order, based on the modified parameter value and at least a portion of the initial parameter values; and
display the new growth scenario.

22. The computer readable medium in accordance with claim 21, wherein the computer readable medium is further programmed to adjust a value of at least two parameters that include a site designation along a network, a route designation within the network, a list of equipment to support the network, an amount of demand to be supported by the network, and a cable type to be used in a route.

23. The computer readable medium in accordance with claim 21, wherein the computer readable medium is further programmed to automatically merge at least one of the initial growth scenario and the new growth scenario into a to-be-built network scenario, the to-be-built network representing a base-lined scenario.

24. The computer readable medium in accordance with claim 21, wherein the computer readable medium is further programmed to enter a state of a currently built network as at least a portion of the initial parameter values, the state of the currently built network representing a deployed scenario.

25. The computer readable medium in accordance with claim 21, wherein the computer readable medium is further programmed automatically merge a base-lined scenario into an existing network scenario, the existing network scenario representing a deployed scenario.

26. The computer readable medium in accordance with claim 21, wherein the computer readable medium is further programmed to:
enter a state of a currently built network as at least a portion of the initial parameter values, the state of the currently built network representing a deployed scenario; and
automatically merge the new growth scenario and a deployed scenario to produce a growth plan.

27. The computer readable medium in accordance with claim 21, wherein the computer readable medium is further programmed to:
calculate a plurality of new growth scenarios; and
automatically calculate a growth plan based on the plurality of new growth scenarios.

28. The computer readable medium in accordance with claim 21, wherein the computer readable medium is further programmed to generate a list of conflicts between the initial growth scenario and the new growth scenario.

* * * * *

UNITED STATES PATENT AND TRADEMARK OFFICE
CERTIFICATE OF CORRECTION

PATENT NO. : 8,321,547 B2
APPLICATION NO. : 12/125213
DATED : November 27, 2012
INVENTOR(S) : Ramasubramanian Anand et al.

Page 1 of 1

It is certified that error appears in the above-identified patent and that said Letters Patent is hereby corrected as shown below:

In Column 17, line 32, Claim 19, delete "10" and insert --13--

Signed and Sealed this
Twelfth Day of February, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,321,547 B2 | Page 1 of 1 |
| APPLICATION NO. | : 12/125213 | |
| DATED | : November 27, 2012 | |
| INVENTOR(S) | : Anand et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 758 days.

Signed and Sealed this
Eleventh Day of November, 2014

Michelle K. Lee
*Deputy Director of the United States Patent and Trademark Office*